A. R. BENNETT.
NUT LOCK.
APPLICATION FILED JULY 16, 1919.
1,323,571.
Patented Dec. 2, 1919.
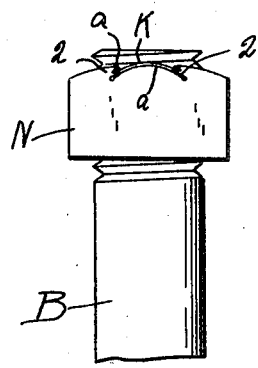
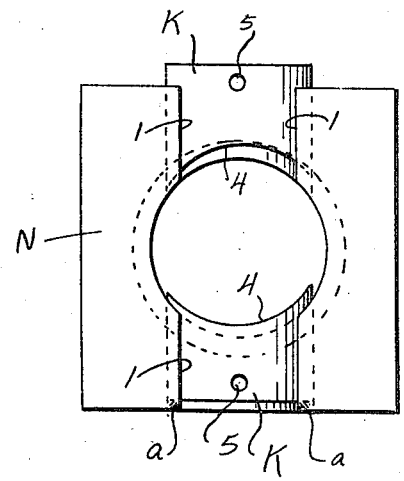
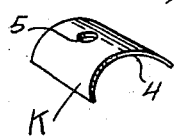
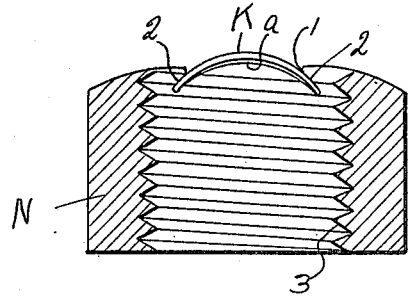
Inventor
A. R. Bennett
By Watson E. Coleman
Attorney

UNITED STATES PATENT OFFICE.

ALVIN R. BENNETT, OF BOWIE, COLORADO.

NUT-LOCK.

1,323,571.  Specification of Letters Patent.  Patented Dec. 2, 1919.

Application filed July 16, 1919. Serial No. 311,240.

*To all whom it may concern:*

Be it known that I, ALVIN R. BENNETT, a citizen of the United States, residing at Bowie, in the county of Delta and State of Colorado, have invented certain new and useful Improvements in Nut-Locks, of which the following is a specification, reference being had to the accompanying drawings.

This invention relates to certain improvements in nut locks and it is an object of the invention to provide novel and improved means for holding the nut against retrograde movement with respect to the bolt or shank to which it is applied and which means includes a key carried by the nut for engagement with the bolt or shank at a plurality of points.

It is also an object of the invention to provide a novel and improved nut lock consisting of a key substantially semi-elliptical in cross section and slidably carried by the nut so that the working end of the key may be caused to jam tightly across the threads of the bolt or shank.

The invention consists in the details of construction and in the combination and arrangement of the several parts of my improved nut lock whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein—

Figure 1 is a view in side elevation illustrating a nut lock constructed in accordance with my invention;

Fig. 2 is an enlarged fragmentary view in top plan of my improved nut lock;

Fig. 3 is a transverse sectional view taken through the device as illustrated in Fig. 2 and at a point midway of the keys; and Fig. 4 is a view in perspective of one of the keys as herein included.

Referring to the accompanying drawings, B denotes a conventional type of bolt adapted to receive the nut N. The nut N in one of its faces, and preferably its outer face, is provided with the diametrically opposed arcuate slots 1 extending from the edges of the nut N to the bore thereof and of a width less than the diameter of the bore. The base of each of the slots 1 is convex in cross section and the side margins of said base *a* are continued by the recesses 2 formed in the sides of the slot 1.

Coacting with each of the slots 1 is a key K substantially semi-elliptical in cross section and which has its side marginal portions engaged within the recesses 2. The cross sectional curvature of the slot 1 and the recesses 2 are such to permit the key K to intersect or cut across one or more threads 3, of the bore of the nut N.

The inner or working end of each of the keys K is inwardly curved, as at 4, on substantially the same radius as the bore of the nut N so that, after the nut N has been applied to the bolt B, when the key K is forced inwardly, the inner or working end of the key K will jam tightly across the threads of the bolt B and thereby effectually hold the nut N against retrograde movement. The particular formation of the working end 4 of the key also assures two effective points of contact with the bolt B.

It is to be understood that an effective locking of the nut N can be obtained with the use of one key K but I am disclosing the use of two of said keys because, under certain conditions, the nut may assume a position wherein a single key could not be employed.

The key K may be readily engaged with the bolt B to set the nut N by imposing a sharp tap with a suitable implement upon the outer end of the key. In order to retract the key K to permit the removal of the nut N from the bolt B, the outer end portion of the key K is provided with an opening 5 in which is adapted to be inserted a punch or other implement so that the requisite force or leverage may be employed to impart the desired outward movement to the key.

Each of the keys K is of a length to have its outer end terminate inwardly of the side face of the nut N when said key is in working or locking engagement with the bolt B and said key may be maintained in such position and against working loose by tapping down the outer ends of the recesses 2 as indicated at *a* in Figs. 1 and 2 of the accompanying drawings.

From the foregoing description it is thought to be obvious that a nut lock constructed in accordance with my invention is particularly well adpted for use by reason of the convenience and facility with which it may be employed and it will also be obvious that my invention is susceptible of some change and modification without departing from the principles and spirit thereof, and for this reason I do not wish to be understood as limiting myself to the precise arrangement and formation of parts herein shown in carrying out my invention in practice except as hereinafter claimed.

I claim:

1. A nut lock including a nut having an arcuate keyway in one surface thereof and a semi-elliptical key having its side edges slidably disposed in said keyway, the inner end of said sides being arranged to arcuately penetrate the threads of a bolt.

2. A nut lock including a nut having an arcuate keyway in one surface thereof and a semi-elliptical key having its side edges slidably disposed in said keyway, the inner end being inwardly curved to provide arcuately projecting, spaced ends at the intersection of the sides and ends, said ends being arranged to arcuately penetrate a bolt.

In testimony whereof I hereunto affix my signature in the presence of two witnesses.

ALVIN R. BENNETT.

Witnesses:
LEONARD BRUCE,
D. L. JONES.